No. 783,270. PATENTED FEB. 21, 1905.
J. HEAZLETT.
GLEANING ATTACHMENT FOR THRESHING MACHINES.
APPLICATION FILED AUG. 17, 1904.
2 SHEETS—SHEET 1.
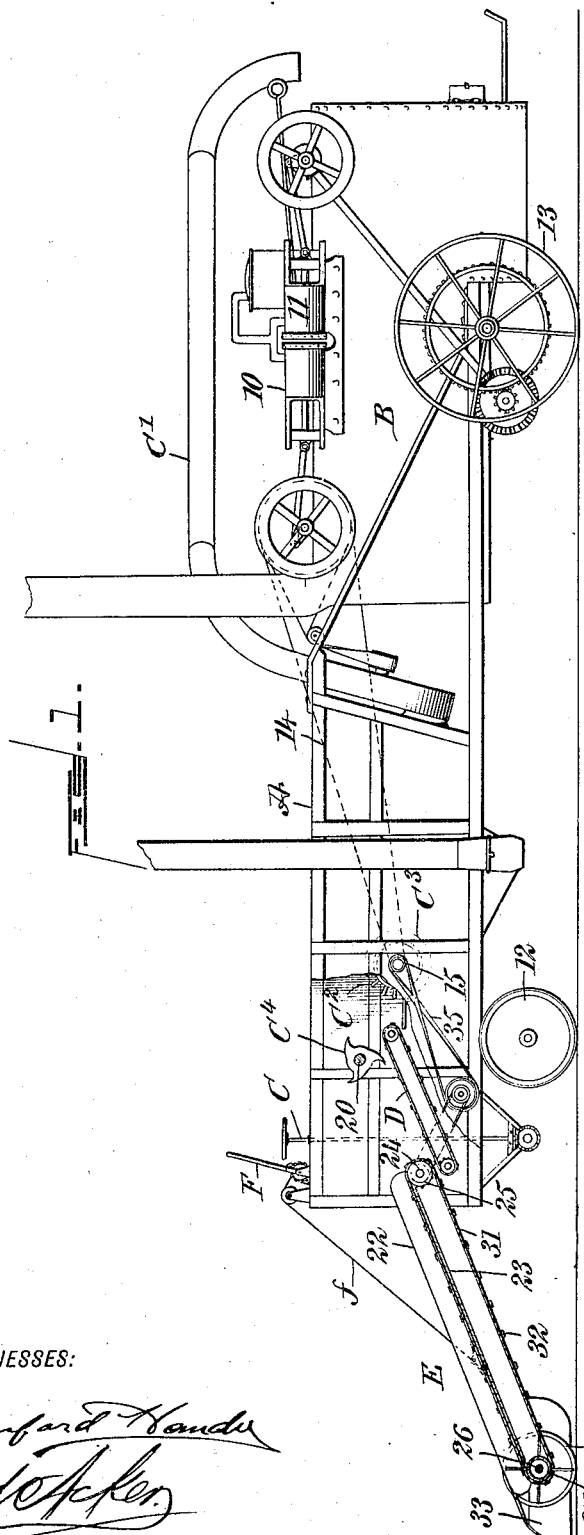
WITNESSES:
INVENTOR
John Heazlett
BY
ATTORNEYS

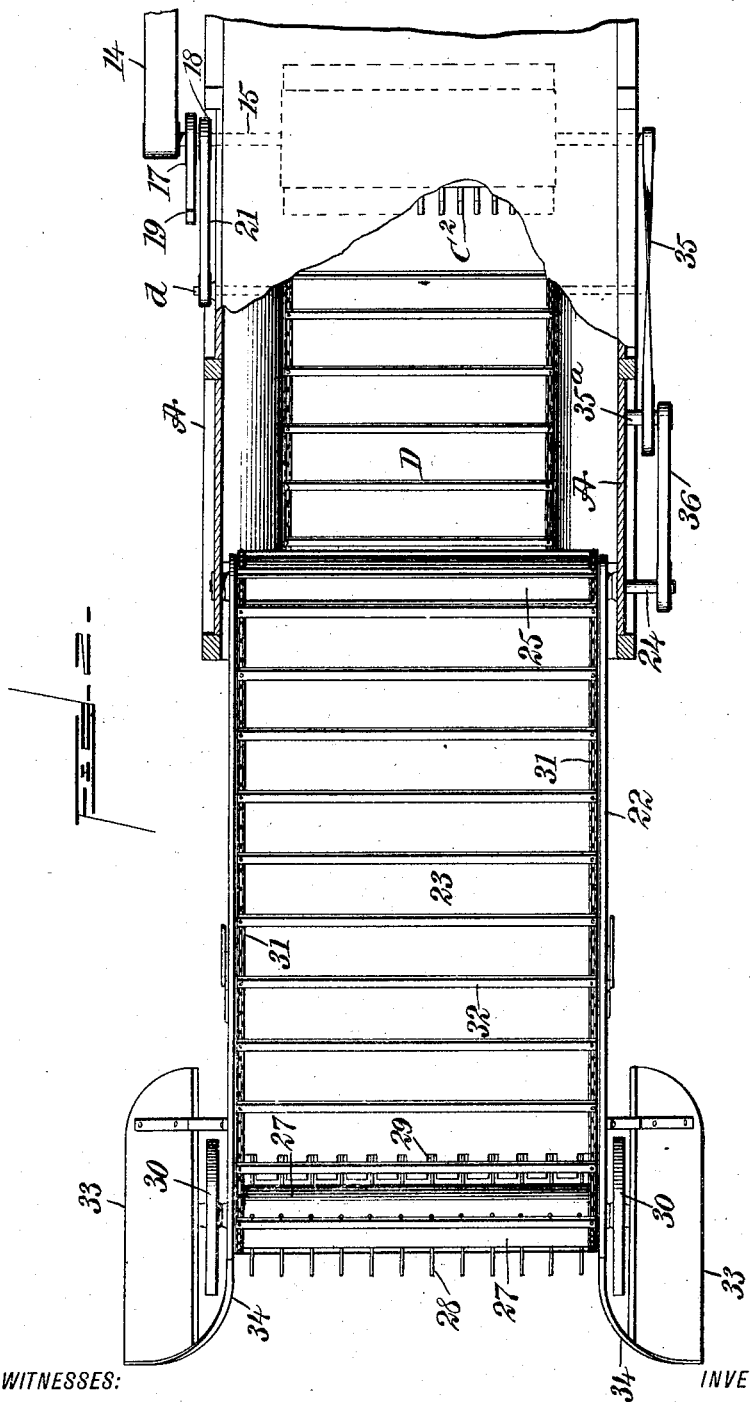

No. 783,270.

Patented February 21, 1905.

UNITED STATES PATENT OFFICE.

JOHN HEAZLETT, OF GLASSTON, NORTH DAKOTA.

GLEANING ATTACHMENT FOR THRESHING-MACHINES.

SPECIFICATION forming part of Letters Patent No. 783,270, dated February 21, 1905.

Application filed August 17, 1904. Serial No. 221,049.

*To all whom it may concern:*

Be it known that I, JOHN HEAZLETT, a citizen of the United States, and a resident of Glasston, in the county of Pembina and State of North Dakota, have invented a new and Improved Gleaning Attachment for Threshing-Machines, of which the following is a full, clear, and exact description.

The purpose of the invention is to provide an attachment to portable threshing-machines, which attachment gleans or gathers the grain lying on the ground loose or in bundles while the machine travels forward through the field, the machine to which the attachment is applied threshing the grain in the ordinary way, thus rendering it unnecessary to gather the grain by means of teams and wagons and convey the grain to the threshing-machine stationary at a fixed point.

The above-mentioned object is accomplished by attaching to the front of the propelled threshing-machine a gatherer and gleaner which as the machine moves onward through the field of grain picks up or gleans the bundles and loose grain, elevating the same to the thresher, where the kernels are threshed out, the threshed grain or kernels being deposited in any receptacle provided for the same, while the straw is disposed of in the customary manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a side elevation of a threshing-machine and the attachment applied, parts being in section; and Fig. 2 is a sectional plan view of the forward portion of the machine, drawn upon a larger scale.

A represents the frame or casing of the threshing-machine, and B a traction-engine, which is connected with the said frame or casing. This engine is a compound engine, being provided with two cylinders 10 and 11. The forward portion of the casing of the threshing-machine is supported on suitable wheels 12, and the wheels 13 for the traction-engine serve as the rear supports for the casing. The machine is provided with the usual elevator and spout utilized to discharge the grain into a wagon or other receptacle.

C' represents a spout which extends from the casing and into which the straw is blown, and the said spout is carried above the said casing to the rear, so that sundry of the straw will be deposited on a platform at the rear of the machine in front of the boiler, enabling a portion of the straw to be used for firing.

C represents any form of steering-gear for the machine, and D represents a feed-apron, which is inclined from the front of the machine upward and rearward to the cylinder $C^2$, in connection with which the ordinary concave $C^3$ is employed, and $C^4$ represents one of a series of band-cutters mounted on a suitable shaft 20, the band-cutter being over the upper portion of the feed-apron D. The cylinder is driven by a suitable belt 14, leading from a driving-pulley on the engine to a pulley on the shaft 15 of the cylinder, as is shown in Fig. 2, and a belt 19 is carried from a pulley 17 on the cylinder-shaft at the right-hand side of the machine to the band-cutter shaft 20, for example. A second belt 21 is carried from a second pulley 18 on the shaft of the cylinder to the shaft $d$, upon which the upper drum of the feed-apron D is mounted.

E represents the gleaning or gathering attachment which is used in connection with the feed-apron D and at its rear or inner end is located above the lower portion of the said apron, as is illustrated in Fig. 2. This gleaning or gathering attachment consists of side-boards 22 and a bed-board 23, connecting the side-boards, and a shaft 24 is journaled in the forward portion of the casing or frame A of the threshing-machine, and on this shaft 24 a drum 25 is secured. At the lower ends of the side-boards 22, in advance of the lower end of the bed-board 23, a shaft 26 extends from the attachment, and on this shaft 26, between the side-boards 22, the lower drum 27 of the attachment is loosely mounted, and the said drum 27 is provided with series of radial teeth 28, which as the drum 27 revolves pass through recesses 29, made in the lower end of the bed-board 23. These teeth 28 pick up the bundles and the loose grain, or, in other words, glean the grain and pass the grain to a conveyer to be hereinafter described. The forward lower end of the attachment is supported by wheels 30, which are mounted to revolve loosely on the outer ends of the shaft 26, above referred to.

The elevator or conveyer for the loose grain and bundles consists of endless chains 31, which pass over sprocket-teeth on the end portions of the drums 25 and 27, and a series of slats 32, which connect the chains 31.

Platforms 33 are supported at the outer faces of the side-boards 22 of the attachment, at the lower end of said attachment, each being adapted to carry an attendant to assist in the orderly taking up of the shocks. Curved guards 34 are secured to the forward ends of the side-boards 22 and to the forward ends of the platforms 33. These guards are given a downward and outward inclination and separate the grain or bundles lying on the ground and which are not to be taken up from the grain or bundles which are to be picked up or gleaned and likewise direct the bundles and loose grain to the teeth 28.

The drum 25 is operated so as to give motion to the conveyer or elevator by means of a belt 35, which passes over a pulley on the left-hand end of the shaft 15 of the cylinder and over a pulley mounted on a stud-shaft $35^a$, mounted to turn at the left-hand side of the machine, which stud-shaft likewise carries a second pulley, and a belt 36 is carried over this latter pulley and over a pulley at the left-hand end of the shaft 24 of the said upper drum 25 of the attachment; but it will be understood that the said shaft $35^a$ may be fixed and the two pulleys on the said shaft be secured together and mounted to turn loosely thereon.

In the operation of the machine as it is driven forward the teeth pick up the bundles and the loose grain, the lower drum 27 carrying the teeth being driven by the slats 32 at the bottom of the conveyer or elevator engaging with the rearwardly-extending teeth of the said drum, and the grain is then carried up by the slats 32 over the upper face of the feed-board 23 and delivered upon the feed-apron D, where the bands of the bundles are cut by the band-cutter, and the grain is then fed by the feed-apron to the concave and cylinder, where it is threshed in the usual manner.

The gathering or gleaning device E is raised and lowered, as occasion may demand, by a winch F, connected with said device by suitable cables $f$.

Having thus described my invention, I claim as new and desire to secure by Letters Patent—

1. In a threshing-machine, the combination with the feed-apron thereof, of a gleaning attachment, comprising upwardly and rearwardly inclined elevator-chains, connected at intervals by transverse slats, and a correspondingly-inclined bed-board provided with side-boards, said bed-board having recesses in its lower end, an upper roller, means for rotating the same to impart motion to the chains, and a lower drum having teeth working through said recesses close to the ground, said teeth being engaged by the slats to impart motion to the drum.

2. The combination in a threshing-machine, of a gleaning attachment comprising side-boards, platforms extending laterally therefrom, and curved guards secured to the forward ends of the said boards and platforms, said guards each having a downward and outward inclination as shown and for the purpose set forth.

In testimony whereof I have signed my name to this specification in the presence of two subscribing witnesses.

JOHN HEAZLETT.

Witnesses:
D. G. McINTOSH,
J. S. SING.